3,468,950
AMINOBICYCLO[3.3.1]NONANES
Alfred W. Chow, Radnor, and George L. Dunn, Wayne,
Pa., assignors to Smith Kline & French Laboratories,
Philadelphia, Pa., a corporation of Pennsylvania
No Drawing. Filed Dec. 20, 1965, Ser. No. 515,158
Int. Cl. C07c 87/36; A61k 27/00
U.S. Cl. 260—563                                      14 Claims

ABSTRACT OF THE DISCLOSURE

Bicyclo[3.3.1]nonanes, substituted at the 1,2,3, or 9-positions with amino or aminomethyl groups are prepared from appropriate bicyclic esters or ketones. The products possess antiviral activity.

---

This invention relates to amino and aminomethyl-bicyclo[3.3.1]nonanes having antiviral activity. In particular, the invention relates to bicyclo[3.3.1]nonanes substituted at the 1,2,3, or 9-position with an amino, a substituted amino, an aminomethyl, or a substituted aminomethyl group.

The chemical compounds of the invention are represented by the following structural formula:

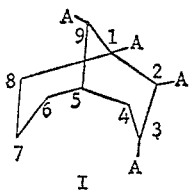

where one A group is (alk)$_n$NRR$^1$ and the other A groups are hydrogen;

$n=0$ or 1;
R is hydrogen, lower alkyl, or lower acyl;
R$^1$ is hydrogen or lower alkyl;

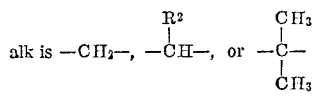

R$^2$ is lower alkyl of 1 to carbon atoms.

Also part of the invention are the pharmaceutically acceptable acid addition salts of the basic compounds of Formula I.

The terms "lower alkyl" and "lower acyl" when used to define the compounds of the present invention, unless otherwise defined, are intended to represent those alkyl and acyl groups having 1 to about 7 carbon atoms therein. Among such groups are methyl, ethyl, propyl, hexyl, acetyl, isobutyryl, and butyryl.

It will be seen that when $n=0$ in Formula I, the compounds are amino or substituted amino bicyclo[3.3.1] nonanes. Such compounds are the preferred compounds of the invention and procedures for their preparation will be first described.

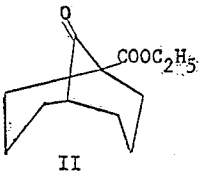 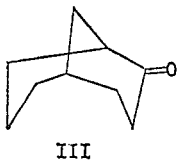

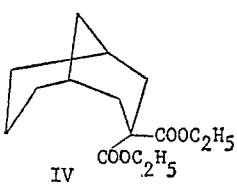 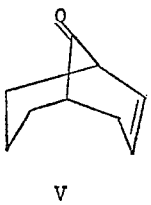

1-aminobicyclo[3.3.1]nonane is prepared by starting with ethyl 9-oxobicyclo[3.3.1]nonane-1-carboxylate (II), forming a dithioketal by acid catalyzed condensation with ethanedithiol, reductively eliminating the ketal function by Raney nickel desulfurization, hydrolyzing the ester to an acid with base, and converting the acid to the amine by conventional methods such as the Curtius Reaction (formation of the azide, transformation to the isocyanate, and hydrolysis to the amine) or the Schmidt Reaction (sodium azide and sulfuric acid).

The 2-aminobicyclo[3.3.1]nonane is prepared by converting bicyclo[3.3.1]nonan-2-one (III) to an oxime by reaction with hydroxylamine and catalytically reducing the oxime to the amine.

The 3-amino compound is prepared by hydrolyzing diethyl bicyclo[3.3.1]nonane-3,3-dicarboxylate (IV) with base, eliminating one of the carboxylic acid groups by heating at ca. 170–175°, and converting the resulting acid to the amine by either the Schmidt or Curtius procedures.

The 9-amino compound is prepared by converting bicyclo[3.3.1]non-2-en-9-one (V) to its oxime with hydroxylamine, reducing the oxime to the olefinic amine with lithium aluminum hydride, and catalytically reducing the double bond. Simultaneous catalytic reduction of the oxime and the olefinic double bond can be used to give the same product in one reaction. The olefinic amine is intended to be part of the present invention; it is useful in that it is an intermediate for preparing other antiviral compounds and is itself active as an antiviral agent.

Compounds of Formula I in which $n=1$ and alk is —CH$_2$—, i.e. the A substituent is an aminomethyl group are prepared as follows. The 1 and 3-aminomethyl compounds are prepared by converting the respective 1 and 3-carboxylic acids to the acid chlorides by treatment with thionyl chloride, forming the respective amides by reaction with ammonia, a lower alkyl, or a dilower alkylamine, and reducing the resulting amides with lithium aluminum hydride. The 2 and 9-aminomethyl compounds are prepared by first treating the corresponding 2 and 9-oxo compounds with methoxymethylene triphenylphosphorane, generated from methoxymethyl triphenylphosphonium chloride and butyl lithium in solvents such as tetrahydrofuran and diglyme. The resulting 2 and 9-methoxymethylene compounds are then converted to the 2 and 9-carboxaldehydes by means of perchloric acid. The aldehydes are then treated with hydroxylamine and the resulting oximes reduced with lithium aluminum hydride to give the aminomethyl compounds. The 9-aminomethyl compounds are also prepared by subjecting the 9-carboxylic acid [J. Org. Chem. 30, 1061 (1965)] to the series of reactions described above, viz chlorination, amination, and reduction.

Compounds in which $n$ is 1 and alk is

are prepared by treating the 1, 3, or 9-carboxylic acid chlorides with methyl magnesium bromide to give α,α-dimethylmethanols, treating these compounds with acetonitrile and sulfuric acid in a Ritter reaction to give N-acetyl-α,α-dimethylmethylamines, and hydrolyzing the acetyl groups with a reagent such as potassium hydroxide. The 2-isomers are prepared by oxidizing the 2-carboxaldehyde to the acid with silver nitrate, converting the acid to the acid chloride, and performing the same reactions as described above.

Compounds in which $n$ is 1 and alk is

are prepared by treating the corresponding carboxylic acids with a lower alkyl lithium to give the alkyl ketones, forming the oximes with hydroxylamine, and reducing the oximes either catalytically or with lithium aluminum hydride.

The various primary amino or aminomethyl compounds of the invention are readily converted into alkyl, dialkyl, or acyl derivatives by well-known procedures. A lower alkylamine is prepared by treatment of the amine with a lower alkyl halide or sulfate. An acylamine is prepared by treatment with an acyl halide or anhydride. An alkylamine is also prepared by reduction of an acylamine with lithium aluminum hydride. Dilower alkyl amines are prepared by acylating an alyklamine and then reducing the acylalkylamine with a reagent such as lithium aluminum hydride. A methylamino compound is prepared by reaction of methanol with a bicyclic isocyanate, followed by reduction of the resulting carbamate with lithium aluminum hydride. A dimethylamino compound is best prepared by heating the primary amine with 90% formic acid and 35% formaldehyde. Substituted aminomethyl compounds may be prepared, in addition to those methods described above, by treatment of the corresponding acid chloride with a primary or secondary amine, followed by reduction.

The basic amine compounds of the invention may be converted to any of a variety of pharmaceutically acceptable acid addition salts by adding an acid, either as such or in the form of an alcoholic, ethereal, or acetone solution, to a solution of the basic amine compound. Among the pharmaceutically acceptable acids which may be used to form the salts are hydrochloric, which is preferred, sulfuric, hydrobromic, citric, pamoic, maleic, cyclohexylsulfamic, nitric, acetic, tartaric, and succinic.

Since the carbon atom to which the amino or aminomethyl group is attached in the 2-amino or aminomethylbicyclo[3.3.1]nonanes is asymmetric, it will be apparent that these product compounds exist in the form of racemic mixtures. Inasmuch as separation of racemic mixtures by various methods is known to the art of organic chemistry, the present invention is intended to embrace the racemic mixtures of these compounds as well as the separated optically active forms.

The antiviral compounds of the invention are active against influenza viruses. They are effective in infected mice when administered orally and subcutaneously in the form of aqueous solutions of their hydrochloride salts at doses of 6.25–100 mg./kg.

The following examples are intended to illustrate the preparation of the compounds of the invention. Various minor modifications in the compounds and in the processes for their preparation which occur to one skilled in the art of medicinal chemistry are intended to be part of the present invention.

EXAMPLE 1

1-aminobicyclo[3.3.1]nonane

A mixture of ethyl 9-oxobicyclo[3.3.1]nonane-1-carboxylate (30 g.) [A. C. Cope and E. S. Graham, J. Am. Chem. Soc. 73, 4702 (1951)], ethanedithiol (60 ml.) and freshly distilled boron trifluoride etherate (10 ml.) is allowed to stand 18 hours at room temperature. The mixture is diluted with ether (300 ml.), and then washed with water, aqueous sodium bicarbonate solution, and again with water.

The crude cyclic ethylenedithioketal remaining after distilling off the ether and excess ethanedithiol is dissolved in absolute ethanol (200 ml.), 300 g. of Raney nickel is added, and the mixture is heated at reflux with stirring for 24 hours. An additional 300 g. of Raney nickel is added and the mixture heated at reflux for another 24 hours. The mixture is filtered, the nickel washed with ethanol and the filtrate distilled in vacuo to give ethyl bicyclo[3.3.1]nonane-1-carboxylate, B.P. 58–61°/3 mm.

A portion of the above ester (7.6 g.) is heated in a refluxing solution of methanol (60 ml.)-water (60 ml.) containing 12 g. of potassium hydroxide for 24 hours. Methanol is removed by heating in vacuo, and the aqueous concentrate extracted with ether and then acidified with dilute hydrochloric acid. The thick white precipitate is removed from the aqueous layer by extraction with ether. Evaporation of the combined, dry ether extracts gives crude white acid. The acid is purified by vacuum sublimation followed by recrystallization from methanol-water, M.P. 95.5–97°.

*Analysis.*—Calc'd for $C_{10}H_{16}O_2$: C, 71.39; H, 9.59. Found: C, 71.39; H, 9.51.

Bicyclo[3.3.1]nonane-1-carboxylic acid (0.8 g.) is allowed to stand overnight in thionyl chloride (10 ml.). The excess thionyl chloride is removed by heating in vacuo to give the crude acid chloride.

The acid chloride is dissolved in acetone (40 ml.), the solution cooled to 3°, and then a solution of sodium azide (0.5 g.) in 5 ml. of water added in one portion. After stirring at 0–5° for 30 minutes, the mixture is diluted with water (70 ml.), extracted with benzene, and the combined extracts are dried over anhydrous magnesium sulfate.

The benzene solution of the azide is heated at reflux for 2 hours and then evaporated in vacuo to give the crude isocyanate.

The isocyanate is dissolved in tetrahydrofuran (30 ml.), concentrated hydrochloric acid added, the solution heated at reflux for 1 hour, and then allowed to stand overnight at room temperature. The tetrahydrofuran is removed in vacuo, the residual solution diluted with water (30 ml.) and 3 ml. of dilute hydrochloric acid. After extraction with ether, the aqueous layer is basified with 10% aqueous sodium hydroxide solution and then extracted with ether. The ether extracts are dried and evaporated to give the title amine. The hydrochloride salt is formed by passing dry hydrogen chloride into an ether solution of the base until precipitation is complete. The white solid is collected to give the desired amine hydrochloride, M.P. >300°.

EXAMPLE 2

2-aminobicyclo[3.3.1]nonane

Hydroxylamine hydrochloride (32.6 g., 0.468 mole) is dissolved in 30 ml. of water to which 130 ml. of 10% sodium hydroxide solution has been added. The pH of this solution should be 6.6.

To the above solution is added 13.8 g. (0.1 mole) of bicyclo[3.3.1]nonan-2-one [J. Am. Chem. Soc. 85, 1325 (1963)] in 25 ml. of alcohol. The resulting mixture is heated at 70° for 2 hours. After cooling, 10 g. of the oxime precipitates.

A solution of 5 g. of the oxime in 500 ml. of methanol (containing some ethereal hydrogen chloride) is hydrogenated over 0.5 g. of platinum oxide at 60 p.s.i. for 16 hours. After concentration, the hydrochloride salt of the title amine is filtered off. Recrystallization from methanol-ether gives the pure salt. The free amine is obtained by dissolving the salt in water, making the solution basic with sodium hydroxide, and extracting the amine with ether. Evaporation gives the amine, which is further purified by distillation.

EXAMPLE 3

3-aminobicyclo[3.3.1]nonane

Diethyl bicyclo[3.3.1]nonane-3,3-dicarboxylate [Naturwissen. 51, 383 (1964)] (59.0 g.) is stirred and refluxed in 700 ml. of 10% ethanolic potassium hydroxide (w./v.) for 18 hours. The reaction mixture is then diluted with ca. 1 volume of water, and most of the alcohol removed on a rotary evaporator. The aqueous residue is treated with decolorizing carbon, filtered, warmed on a steam bath, and made strongly acidic with conc. hydrochloric acid. After chilling, the white solid diacid is filtered off and dried; M.P. 161–162° dec.

The dicarboxylic acid (39.6 g.) is heated in an oil bath at 170–175° (bath temperature) until evolution of carbon dioxide is complete (ca. 15–20 minutes). The cooled residue is recrystallized from acetonitrile to give the 3-carboxylic acid, M.P. 121–123°.

To a stirred solution of 21 g. of the monocarboxylic acid in 750 ml. of chloroform is added 200 ml. of conc. sulfuric acid. The reaction mixture is maintained at 45–50° as 13.0 g. of sodium azide is added portionwise over a 30 minute period. After stirring for an additional hour at 45–50°, the reaction mixture is quenched in ice water, the layers separated, and the organic layer washed with two more portions of water. The combined aqueous phases are chilled in an ice bath and made strongly alkaline with 40% sodium hydroxide. The free amine is extracted into ether (3×500 ml.), the ethereal solution dried and evaporated to give the title amine product. A solution of the amine in ether is treated with dry hydrogen chloride until precipitation of the hydrochloride salt is complete. The product is recrystallized from isopropyl alcohol and sublimes without melting at 360°.

EXAMPLE 4

9-aminobicyclo[3.3.1]nonane

To a solution of bicyclo[3.3.1]non-2-en-9 one (15 g.) [C. S. Foote and R. B. Woodward, Tetrahedron, 20, 687 (1964)] in 30 ml. of 95% alcohol is added a solution of hydroxylamine hydrochloride (37.5 g.) in 150 ml. of water, followed by 150 ml. of 10% aqueous sodium hydroxide solution. The mixture is stirred and heated at 70–85° for 15 minutes. The solution is filtered hot and then cooled in ice. The precipitated white solid is collected and air-dried to give the desired oxime, M.P. 142–144°.

*Analysis.*—Calc'd for $C_9H_{13}NO$: C, 71.49; H, 8.67; N, 9.26. Found: C, 71.54; H, 8.72; N, 9.08.

To a stirred hot suspension of lithium aluminum hydride (2.5 g.) in 250 ml. of dry tetrahydrofuran is added during 10 minutes a solution of bicyclo[3.3.1]non-2-en-9-one oxime (5 g.) in 125 ml. of tetrahydrofuran. The reaction is heated at reflux overnight, then cooled in ice, and the excess lithium aluminum hydride destroyed by cautious addition of 2.5 ml. of water, followed by sufficient saturated sodium sulfate solution to create a white suspension. Solid sodium sulfate (10–15 g.) is added, the mixture filtered and the filtrate evaporated to a residual oil in vacuo. The residue is shaken with ether, a water layer separates, and the organic layer is dried over anhydrous magnesium sulfate. Addition of ethereal hydrogen chloride gives a thick white precipitate which is collected and recrystallized from isopropyl alcohol-ethyl acetate to give 9 - aminobicyclo[3.3.1]non - 2 - ene hydrochloride, M.P. >300°.

*Analysis.*—Calc'd for $C_9H_{16}ClN$: C, 62.24; H, 9.29; N, 8.06; Cl, 20.41. Found: C, 62.15; H, 9.45; N, 8.07; Cl, 20.53.

The free base is obtained by conventional basification and extraction procedures.

A solution of 9-aminobicyclo[3.3.1]non-2-ene hydrochloride (3.5 g.) in 120 ml. of absolute ethanol containing 1 g. of 10% palladium on carbon is hydrogenated at 60 p.s.i. in a Parr apparatus for 7 hours. Addition of fresh catalyst and rehydrogenation may be necessary to achieve complete reduction of the double bond. After removal of the catalyst and evaporation of the solvent, the hydrochloride salt of the title product is recrystallized from 95% alcohol-ethyl acetate; M.P. >300°. The free amine is obtained by conventional basification and extraction procedures.

*Analysis.*—Calc'd for $C_9H_{18}ClN$: C, 61.52; H, 10.33; N, 7.97; Cl, 20.18. Found: C, 61.16; H, 10.30; N, 7.78; Cl, 20.04.

EXAMPLE 5

1-methylaminobicyclo[3.3.1]nonane

Bicyclo[3.3.1]nonane-1-isocyanate (3.3 g., .02 mole, Example 1) is dissolved in 60 ml. of methanol and the solution is then refluxed for 2 hours. The solvent is evaporated in vacuo 50 ml. of dry tetrahydrofuran is added to the resulting carbamate, and the mixture is refluxed with 0.76 g. of lithium aluminum hydride for four hours. The reaction mixture is decomposed with water and filtered, and the filtrate evaporated to give the title product. The pure product is obtained either by distillation or by conversion from a previously recrystallized hydrochloride salt.

EXAMPLE 6

1-aminomethylbicyclo[3.3.1]nonane

A solution of 5.04 g. (.03 mole) of bicyclo[3.3.1]nonane-1-carboxylic acid in 25 ml. of thionyl chloride is refluxed for 2 hours and then allowed to stand overnight at room temperature. The excess thionyl chloride is evaporated in vacuo, the residual oil is taken up in benzene, and the solution further evaporated to give the acid chloride.

This acid chloride is dissolved in 15 ml. of dry tetrahydrofuran and the solution added dropwise to an ice-cold solution of conc. aqueous ammonia (ca. 75 ml.). After stirring for 1 hour, water is added, and the amide either removed by filtration or extracted with an organic solvent.

To a slurry of 3.04 g. of lithium aluminum hydride in 400 ml. of refluxing tetrahydrofuran is added in portions, over 1 hour, 3.34 g. of this amide, all under nitrogen. The mixture is heated at reflux for 24–48 hours, cooled, and the excess hydride decomposed by the cautious addition of water. The resulting white slurry is filtered, the filter cake washed with ether, and the filtrates combined and evaporated in vacuo to give the title aminomethyl product.

EXAMPLE 7

2-dimethylaminobicyclo[3.3.1]nonane 2-aminobicyclo[3.3.1]nonane (1.5 g.) is mixed with 0.5 mole of 90% formic acid and 0.22 mole of 35% formaldehyde solution. The mixture is heated for 12 hours on the steam bath, 50 ml. of conc. hydrochloric acid is then added, and the mixture evaporated to dryness in vacuo. To the residue is added 200 ml. of 1 N sodium hydroxide. The product is obtained by extraction with ether and drying and evaporating the ether. The pure product is obtained by distillation or by conversion from a previously purified hydrochloride salt.

EXAMPLE 8

2-aminomethylbicyclo[3.3.1]nonane

A stirred suspension of 40 g. (.105 mole) of methoxymethyl triphenylphosphonium chloride in 200 ml. of tetrahydrofuran and 200 ml. of diglyme is treated dropwise with 105 ml. (.10 mole) of ethereal n-butyl lithium in a nitrogen atmosphere, and the mixture allowed to stir for 3 hours at 25°. To the resulting deep red solution is added dropwise a solution of 6.9 g. (.05 mole) of bicyclo[3.3.1]nonan-2-one in 40 ml. each of tetrahydrofuran and diglyme. After stirring for 4 hours at 25°, the tetrahydrofuran is removed by heating on the steam bath, 200 ml. of diglyme is added, and the mixture is refluxed for 7 hours. The mixture is cooled, concentrated to one-half volume in vacuo, and treated with methyl bromoacetate to remove any triphenylphosphine. After standing 12 hours, the solid is filtered off, the filtrate washed with water, and the dried organic layer evaporated to give an oil. Column chromatography over alumina gives the 2-methoxymethylene compound.

This vinyl ether is allowed to stand for 15 minutes at room temperature in a saturated solution of ether in perchloric acid, poured into aqueous sodium bicarbonate and extracted with ether. Evaporation of the dried ether extracts gives the 2-carboxaldehyde.

To a solution of 18.75 g. of hydroxylamine hydrochloride in 75 ml. of water and 75 ml. of 10% aqueous sodium hydroxide is added a solution of 8.3 g. of the 2-aldehyde in 100 ml. of 95% alcohol. The mixture is heated at 70–80° for 15 minutes, filtered hot, and then diluted with 350 ml. of cold water. The precipitate is collected and dried to give the 2-oxime.

To a slurry of 3.5 g. of lithium aluminum hydride in 300 ml. of refluxing tetrahydrofuran is added over 20 minutes a solution of 7.1 g. of the 2-oxime in 150 ml. of tetrahydrofuran. The mixture is heated at reflux for 3 hours, cooled, and the excess hydride decomposed by cautious addition of water. The resulting white slurry is filtered, the filter cake washed with ether, and the combined filtrates dried and evaporated to give the title 2-aminomethylbicyclo[3.3.1]nonane.

EXAMPLE 9

3-acetamidobicyclo[3.3.1]nonane 3-aminobicyclo[3.3.1]nonane (2.78 g., .02 mole) is allowed to stand overnight with 5 g. of acetic anhydride in 100 ml. of pyridine. The reaction mixture is then diluted with ice water and the amide product removed by filtration or extracted with a solvent such as ether or chloroform. Recrystallization yields the pure product.

EXAMPLE 10

3-(N-ethylacetamido)bicyclo[3.3.1]nonane

A solution of 1.81 g. (.01 mole) of the amide of Example 9 in 50 ml. of dry tetrahydrofuran is refluxed for 2 hours with 0.45 g. of 53.5% sodium hydride. A solution of 1.56 g. of ethyl iodide in 25 ml. of dry tetrahydrofuran is added to the cooled reaction mixture which is then refluxed for twelve hours. A small amount of water is cautiously added with cooling, the solution is filtered, and most of the tetrahydrofuran evaporated in vacuo. A further quantity of water is added, the alkaline solution is extracted with ether, and the extracts dried and evaporated to give the title product.

EXAMPLE 11

3-diethylaminobicyclo[3.3.1]nonane

A solution of 2.09 g. (.01 mole) of the N-ethylacetamido compound of Example 10 in 100 ml. of dry tetrahydrofuran is refluxed with 0.5 g. of lithium aluminum hydride for 12 hours. The excess hydride is decomposed by the cautious addition of water, with cooling. The solution is filtered, the filtrate extracted with ether, and the ether extracts evaporated to give the diethylamino product.

Reduction of the 3-acetamido compound of Example 9 in the same manner gives the 3-ethylamino compound.

EXAMPLE 12

3-aminomethylbicyclo[3.3.1]nonane

Bicyclo[3.3.1]nonane-3-carboxylic acid (5.04 g., .03 mole, Example 3) is converted to the amide and then reduced to the title compound in accordance with the procedure described in Example 6.

EXAMPLE 13

9-propylaminobicyclo[3.3.1]nonane

To a stirred solution of 250 ml. of absolute alcohol, 25 g. of sodium bicarbonate, and 17.6 g. of 9-aminobicyclo[3.3.1]nonane hydrochloride is added 17.0 g. of propyl iodide. The mixture is warmed and maintained at a temperature sufficient to cause the evolution of carbon dioxide until the gas evolution ceases. The mixture is cooled and filtered, and the solvent evaporated. Sodium hydroxide (10%) is added to the residue, and the basic mixture extracted with ether. The ether extracts are dried and evaporated to give an oil which is distilled to give the title product.

EXAMPLE 14

$\alpha,\alpha$-dimethylbicyclo[3.3.1]nonane-1-methylamine

To a solution of 30.6 g. of bicyclo[3.3.1]nonane-1-carboxylic acid chloride (Example 1) in 500 ml. of anhydrous ether under a nitrogen atmosphere is added dropwise 150 ml. of commercial 3M methyl magnesium bromide at a rate which maintains a gentle reflux. The reaction mixture is heated for 1 hour after the addition, then cooled. To decompose the metal complex, 300 ml. of saturated ammonium chloride is added. The ether layer is separated and the aqueous layer is extracted with 100 ml. of chloroform. This extract is combined with the ether layer, and the mixture is dried with anhydrous magnesium sulfate and vacuum-concentrated to dryness at 35° C. The residue is steam-distilled until the distillate is no longer milky, about 3 liters of distillate being collected. After cooling, the steam distillate is extracted with two 250 ml. portions of ether, which are combined, dried with anhydrous magnesium sulfate, and vacuum concentrated to yield $\alpha,\alpha$-dimethylbicyclo-[3.3.1]nonane-1-methanol.

A 35 ml. amount of concentrated sulfuric acid is added dropwise, with cooling to hold the temperature below 10° C., to 160 ml. of acetonitrile. Then, 20.4 g. of $\alpha,\alpha$-dimethylbicyclo[3.3.1]nonane-1-methanol is added. The temperature is raised to 48° C. and maintained at 48° C. for 45 minutes. The reaction mixture is allowed to cool to room temperature and is then slowly poured into 1000 ml. of ice water. The solids which separate are filtered and dried and then taken up in 500 ml. of ether. Dry hydrogen chloride is bubbled into the ether solution until no further precipitation occurs. The solids are filtered, dried, and placed in a separatory funnel containing 200 ml. of water and 500 ml. of ether. This is shaken until the solids dissolve, and the aqueous layer is separated and discarded. The ether solution is dried with anhydrous sodium sulfate and concentrated to dryness to give N-acetyl-$\alpha,\alpha$-dimethylbicyclo[3.3.1]nonane-1-methylamine.

A mixture of 2.0 g. of N-acetyl-$\alpha,\alpha$-dimethylbicyclo-[3.3.1]nonane-1-methylamine, 10 g. of potassium hydroxide and 40 ml. of methanol is heated at 225° C. in a sealed tube for 18 hours, then cooled. The tube contents are added to 100 ml. of water, and the mixture is extracted with two 50 ml. portions of ether. The extracts are combined, dried with potassium hydroxide, and evaporated to give the title amine product. A hydrochloride is prepared by bubbling hydrogen chloride into an ether solution of the amine until precipitation is complete. The salt is filtered off, dried, and recrystallized to give the pure hydrochloride.

Substitution of the 3-carboxylic acid chloride in the above procedure gives the corresponding α,α-dimethyl-3-methylamine.

EXAMPLE 15

α-methylbicyclo[3.3.1]nonane-2-methylamine

Bicyclo[3.3.1]nonane-2-carboxylic acid [prepared from the 2-carboxaldehyde by silver nitrate oxidation as described in J. Org. Chem. 30, 1061 (1965)] (4.95 g., 0.0295 mole) is dissolved in 100 ml. of dry tetrahydrofuran and, with stirring under nitrogen, 31 ml. (0.062 mole) of 2 N methyl lithium in ether is added over 3 to 4 minutes. The mixture is refluxed overnight and cooled to room temperature. Water (25 ml.) is added, and the product extracted into ether. After drying over magnesium sulfate, the ether is removed to yield bicyclo[3.3.1]non-2-yl methyl ketone.

To a mixture of 5.80 g. of this ketone, 3.22 g. (0.0463 mole) of hydroxylamine hydrochloride, and 15 ml. of ethanol are added, portionwise with stirring, 3 ml. of water and 5.9 g. (0.147 mole) of powdered sodium hydroxide. The reaction mixture is stirred and refluxed for 5 minutes and then poured into an ice cold solution of 20 ml. (0.240 mole) of concentrated hydrochloric acid in 110 ml. of water. The colorless solid is filtered and washed with water. After drying over phosphorous pentoxide, the oxime of the ketone is obtained.

A solution of 3.84 g. of the oxime in 50 ml. of tetrahydrofuran is added to a stirred suspension of 2.93 g. (0.077 mole) of lithium aluminum hydride in 75 ml. of ether. The mixture is stirred and refluxed overnight. After cooling to room temperature, 7 ml. (7.0 g., 0.0389 mole) of water is added dropwise, and the mixture is stirred 1 hour at room temperature. The solid is filtered and washed well with ether. The ether is dried with solid potassium hydroxide and then with magnesium sulfate, and the product obtained by removal of the ether. The hydrochloride salt is obtained by bubbling dry hydrogen chloride into an ether solution of the product amine until precipitation is complete, filtering off and drying the precipitate, and then recrystallizing the salt.

The α-lower alkyl derivatives of the 9-methylamine are prepared by substituting the 9-carboxylic acid [J. Org. Chem. 30, 1061 (1965)] for the 2-acid in the above procedure, and an equivalent amount of ethyl lithium, propyl lithium, or butyl lithium for the methyl lithium.

We claim:
1. A compound of the formula

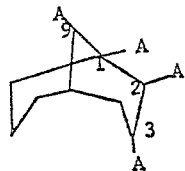

where one A group is (alk)$_n$NRR$^1$ and the other A groups are hydrogen;

n is 0 or 1;
R is hydrogen, or lower alkyl;
R$^1$ is hydrogen or lower alkyl;

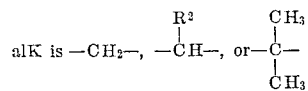

R$^2$ is lower alkyl of 1 to 4 carbon atoms;
or a pharmaceutically acceptable acid addition salt thereof.

2. A compound according to claim 1 in which the A group at the 1-position is (alk)$_n$NRR$^1$ and the other A groups are hydrogen.

3. A compound according to claim 1 in which the A group at the 2-position is (alk)$_n$NRR$^1$ and the other A groups are hydrogen.

4. A compound according to claim 1 in which the A group at the 3-position is (alk)$_n$NRR$^1$ and the other A groups are hydrogen.

5. A compound according to claim 1 in which the A group at the 9-position is (alk)$_n$NRR$^1$ and the other A groups are hydrogen.

6. A compound according to claim 2 in which alk is

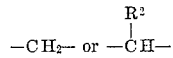

R and R$^1$ are hydrogen or methyl; R$^2$ is methyl; and the salt is the hydrochloride.

7. A compound according to claim 3 in which alk is

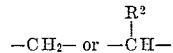

R and R$^1$ are hydrogen or methyl; R$^2$ is methyl; and the salt is the hydrochloride.

8. A compound according to claim 4 in which alk is

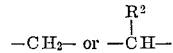

R and R$^1$ are hydrogen or methyl; R$^2$ is methyl; and the salt is the hydrochloride.

9. A compound according to claim 5 in which alk is

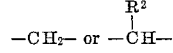

R and R$^1$ are hydrogen or methyl; R$^2$ is methyl; and the salt is the hydrochloride.

10. A compound according to claim 6 in which R and R$^1$ are hydrogen and n is 0.

11. A compound according to claim 7 in which R and R$^1$ are hydrogen and n is 0.

12. A compound according to claim 8 in which R and R$^1$ are hydrogen and n is 0.

13. A compound according to claim 9 in which R and R$^1$ are hydrogen and n is 0.

14. 9-aminobicyclo[3.3.1]non-2-ene or its hydrochloride salt.

References Cited

UNITED STATES PATENTS 3,347,919  10/1967  Martin _____ 260—563

CHARLES B. PARKER, Primary Examiner

P. C. IVES, Assistant Examiner

U.S. Cl. X.R.

260—485, 501.1, 501.21, 514, 544, 561, 566, 586, 598, 617; 424—325